US008635216B1

(12) United States Patent
Hepworth et al.

(10) Patent No.: US 8,635,216 B1
(45) Date of Patent: Jan. 21, 2014

(54) ENHANCING NETWORK INFORMATION RETRIEVAL ACCORDING TO A USER SEARCH PROFILE

(75) Inventors: Neil Hepworth, Artarmon (AU); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1852 days.

(21) Appl. No.: 10/956,958

(22) Filed: Sep. 30, 2004

(51) Int. Cl.
*G06F 17/30* (2006.01)

(52) U.S. Cl.
USPC .......... 707/733; 707/706; 707/722; 707/736; 706/12; 706/14; 706/45

(58) Field of Classification Search
None
See application file for complete search history.

(56) References Cited

U.S. PATENT DOCUMENTS

| | | | | |
|---|---|---|---|---|
| 5,220,625 A * | 6/1993 | Hatakeyama et al. | ....... | 715/809 |
| 5,681,285 A * | 10/1997 | Ford et al. | ..... | 604/151 |
| 6,029,195 A * | 2/2000 | Herz | ..... | 725/116 |
| 6,321,228 B1 * | 11/2001 | Crandall et al. | ..... | 1/1 |
| 6,539,377 B1 * | 3/2003 | Culliss | ..... | 707/5 |
| 6,564,210 B1 * | 5/2003 | Korda et al. | ..... | 1/1 |
| 6,571,239 B1 * | 5/2003 | Cole et al. | ..... | 707/5 |
| 6,603,571 B1 * | 8/2003 | Nomoto | ..... | 358/1.15 |
| 6,981,040 B1 * | 12/2005 | Konig et al. | ..... | 709/224 |
| 7,152,061 B2 * | 12/2006 | Curtis et al. | ..... | 707/3 |
| 7,181,442 B2 * | 2/2007 | Yeh et al. | ..... | 707/3 |
| 7,181,447 B2 * | 2/2007 | Curtis et al. | ..... | 707/3 |
| 7,203,674 B2 * | 4/2007 | Cohen | ..... | 707/3 |
| 7,257,589 B1 * | 8/2007 | Hull et al. | ..... | 707/101 |
| 7,260,643 B2 * | 8/2007 | Chi et al. | ..... | 709/238 |
| 7,440,968 B1 * | 10/2008 | Oztekin et al. | ..... | 707/102 |
| 7,472,119 B2 * | 12/2008 | Dai et al. | ..... | 707/5 |
| 2002/0055912 A1 * | 5/2002 | Buck | ..... | 705/76 |
| 2002/0103789 A1 * | 8/2002 | Turnbull et al. | ..... | 707/3 |
| 2002/0143759 A1 * | 10/2002 | Yu | ..... | 707/5 |
| 2003/0188734 A1 * | 10/2003 | Galassi | ..... | 126/299 R |
| 2004/0024653 A1 * | 2/2004 | Edgardo et al. | ..... | 705/26 |
| 2004/0068477 A1 * | 4/2004 | Gilmour et al. | ..... | 707/1 |
| 2005/0055340 A1 * | 3/2005 | Dresden | ..... | 707/3 |
| 2005/0071328 A1 * | 3/2005 | Lawrence | ..... | 707/3 |
| 2005/0097188 A1 * | 5/2005 | Fish | ..... | 709/217 |
| 2005/0108404 A1 * | 5/2005 | Philyaw et al. | ..... | 709/227 |
| 2005/0114881 A1 * | 5/2005 | Philyaw et al. | ..... | 725/25 |
| 2005/0120003 A1 * | 6/2005 | Drury et al. | ..... | 707/3 |
| 2005/0131866 A1 * | 6/2005 | Badros et al. | ..... | 707/3 |
| 2005/0132003 A1 * | 6/2005 | Philyaw | ..... | 709/204 |
| 2005/0203884 A1 * | 9/2005 | Allen et al. | ..... | 707/3 |
| 2005/0222989 A1 * | 10/2005 | Haveliwala et al. | ..... | 707/3 |
| 2005/0278317 A1 * | 12/2005 | Gross et al. | ..... | 707/3 |
| 2006/0041562 A1 * | 2/2006 | Paczkowski et al. | ..... | 707/10 |
| 2006/0090184 A1 * | 4/2006 | Zito et al. | ..... | 725/46 |
| 2007/0282797 A1 * | 12/2007 | Wang et al. | ..... | 707/3 |
| 2008/0033835 A1 * | 2/2008 | Philyaw | ..... | 705/26 |
| 2008/0140640 A1 * | 6/2008 | Raff | ..... | 707/5 |

* cited by examiner

*Primary Examiner* — Hung Le
(74) *Attorney, Agent, or Firm* — Sheridan Ross P.C.

(57) ABSTRACT

An enhancement to a search engine is disclosed for prioritizing search results obtained from an information search engine such as those accessible via a network (e.g., the Internet and/or a corporate intranet). In response to a user search query, the enhanced search engine of the invention prioritizes the search results using stored information indicative of network sites: (a) previously visited by the user, and/or (b) to which the user has indicated an interest (or disinterest) in the content thereof. Additionally, the invention prioritizes the search results using stored information indicative of other users that are determined to have similar searching interests. Thus, since the stored information can dynamically change, repeated performances of the same search can present different initial, more user customized, portions of the search results.

21 Claims, 5 Drawing Sheets

```
400    Importance_value(user, RESULT)
401        If (RESULT has a user importance value) then
402            user_imp_val ← the user importance value for RESULT;
403        Else if (RESULT is one of a plurality of network content pages having a common
404                network initial portion of a network address with a network site (NS)
405                having a user importance value) then
406            user_imp_val ← ½ * (user importance of network site NS);
407        Else user_imp_val ← 0;
408        Return (user_imp_val).
```

Fig. 4

```
500    Similarity_importance_value(similar_users, RESULT)
501        if (similar_users has at least entry thereon) then {
502            For each entry similar_users[j] of similar_users do
503                similar_imp_vals[j] ← importance_value(similar_users[j],
504                                                        RESULT);
505            similar_imp_val ← average(similar_imp_vals[j] over all similar users);
506        else similar_imp_val ← 0;
507        Return(similar_imp_val).
```

Fig. 5

```
600    Keyword_importance_value(user, Pos_keywords, Neg_keywords, RESULT)
601        Total_pos ← the total number of words on Pos_keywords list for the user;
602        Total_neg ← the total number of words on Neg_keywords list for the user;
603        site_keywords ← keywords for RESULT;
604        Nbr_site_positive_keywords ← get number of words from site_keywords that
605                                      are also in Pos_keywords;
606        Nbr_site_negative_keywords ← get number of words from site_keywords that
607                                      are also in Neg_keywords;
608        If (Total_pos == 0) then
609            If (Total_neg == 0) then keyword_imp_val ← 0;
610            else keyword_imp_val ← (-1) * (Nbr_site_negative_keywords/Total_neg);
611        else if (Total_neg == 0) then
612            keyword_imp_val ← Nbr_site_positive_keywords/Total_pos;
613        else keyword_imp_val ← (Nbr_site_positive_keywords/Total_pos) -
614                                (Nbr_site_negative_keywords/Total_neg);
615        Return(keyword_imp_val).
```

Fig. 6

```
700    Prioritize_results(user, RESULTS)
701        Similar_users ← get identifications of users that are similar to user;
702        Pos_keywords ← get user's keywords indicative of network sites the has
703                        previously appeared to find of interest;
704        Neg_keywords ← get user's keywords indicative of network sites the has
705                        previously appeared to be disinterested in;
706        For each entry RESULTS[i] in RESULTS do {
707            RESULT[i].importance ← [(wt1) * Importance_value(user,
708                RESULTS[i])] + [(wt2) * Similarity_importance_value(similar_users,
709                RESULTS[i])] + [(wt3) * Keyword_importance_value(user,
710                Pos_keywords, Neg_keywords, RESULTS[i])];
711            Move RESULT[i] so that all (any) entries on RESULTS in front of the
712            new position of RESULT[i] have higher importances than
713            RESULT[i].importance;
714        }
715        Return(RESULTS).
```

Fig. 7

ENHANCING NETWORK INFORMATION RETRIEVAL ACCORDING TO A USER SEARCH PROFILE

RELATED FIELD OF THE INVENTION

The present invention relates to enhancing the relevancy of search results obtained from an informational search engine, and in particular, to presenting such search results to the user in an order wherein search results that are considered more relevant to the user are presented first.

BACKGROUND

Providing a query to a search engine on a network, such as the Internet, often results in large numbers of search results being returned to the user, each reference presumably having information determined to be relevant to the search query. Unfortunately, there is no easy way for a user receiving such search results to know what is really of interest to him/her without reviewing the informational content of most, if not all, the search results returned to him/her. However, such a review is at least burdensome if not physically impossible in cases where an extremely large number of search results (e.g., 2,000 to 100,000 or more) are provided to the user. Accordingly, the user has the option of spending a substantial amount of time reviewing the search results, and/or reviewing only portions of the search results and hoping that the information he/she desires occurs in the search results reviewed.

Accordingly, it would be desirable to have a capability for the user to obtain such search results in an order that puts the results of more likely interest or importance to the user toward the front/top of the list of returned search results, and/or puts the results of less likely interest or importance to the user toward the end of the list of returned search results. More particularly, it would be desirable to use information indicative of past user interests (and/or the interests of other users "similar" to the user) to order the user's subsequent search results so that the results more likely to be of interest to the user are presented first.

SUMMARY

The present invention is a method and system for prioritizing or ordering search results obtained from an information search engine such as those accessible via a communications network, e.g., the Internet and/or a corporate intranet. In response to a user search query, the present invention uses stored information indicative of network sites to prioritize search results obtained from performing the search query. For example, the stored information may be representative of the informational content at various network sites (and/or network identifiers for such sites) that the user has previously visited, expressed an interest, or expressed a disinterest. To perform such prioritizing of search results, the present invention collects user-specific information related to network sites and/or their informational content and stores this information in a user-specific search profile. Accordingly, in determining, for a future search query, what search results are more likely to be of interest to the user, information in the user's search profile is accessed, and used to order the search results. Subsequently, the search results that are more likely to be of interest to the user are presented to the user before other search results.

Moreover, for a given user, it is an aspect of the present invention that information in the search profiles of other users can be used to assist in determining whether one or more search results are likely to be of interest to the given user. In particular, embodiments of the present invention can determine one or more other users that are deemed similar to the given user in their searching interests, and use the search profiles of these other users to assist in determining the given user's likely interest (or disinterest) in various search results. For instance, since the search profile for each user may include:

(a) network site identifications (e.g., network pathnames/ addresses or Internet URLs) that the user has previously visited, (b) bookmarks of network site identifications (e.g., site identifications added to a list of favorites in an Internet browser), and/or (c) the information indicative of the content of network sites of interest (or disinterest) to the user, comparisons can be made between the corresponding contents of the data categories (a) through (c) above to determine whether two users are appropriately similar, and if so, then information in one of the users profiles can be presumed to be predictive of likely interests to the other user. Thus, for the given user and a second user (different from the given user) that are determined to be similar, if a search result for the given user identifies network site not identified in the given user's search profile, but is identified in the second user's search profile, then the likely interest of the given user in the network site may be increased.

Note that it is an aspect of the present invention that a user's search profile may change over time. Thus, since search results can be ordered according to the user's search profile, a user iteratively performing the same search may obtain different initial search results. That is, depending upon the user's responses to one of the searches, the user search profile may change prior to a subsequent search, and when a subsequent search is performed, the same search results may be ordered differently. Thus, for searches generating a very large number of search results (e.g., 100,000 results), the user may be able to provide sufficient feedback in terms of network sites he/she finds of interest and/or disinterest so that a subsequent identical search provides the user with a substantially different initial collection of search results according to a reordering of the search results indicative of new search profile information for the user.

In at least some embodiments of the invention, the following steps are performed:

(Step A) receiving a network communication from a user, the network communication including "visitation" information (which herein refers to any information which may be predictive of the user's searching interests and/or the user's searching disinterests) related to at least one network site previously visited by the user;

(Step B) determining, using the visitation information, information related to one or more network sites visited by at least one other user;

(Step C) prioritizing search results requested by the user using information related to at least one network site visited by the other user; and subsequently, (Step D) providing the user with the search results in an order corresponding to the prioritized search results from said step of prioritizing.

In at least some embodiments of the invention, the following steps are performed:

(Step A) receiving one or more network communications including one or more of (a) data indicative of one or more sites on a network whose content is more likely to be of interest to a first user, (b) data indicative of one or more sites on the network whose content is less likely to be of interest to the first user, and (c) data indicative of at least one network site, the data indicative of the at least one network site obtained from one or more other users;

(Step B) storing the data for the one or more of (a) through (c) received, and an identification of the first user;

(Step C) obtaining a search query from the first user;

(Step D) determining at least a first and a second search result for responding to the search query;

(Step E) prioritizing at least the first search result according to a comparison between: (1) data for the first search result, and (2) the stored one or more of (a) through (c); and (Step F) providing the user with at least a portion of the search results, wherein the first search result is presented to the first user in a position that is determined using a priority of the first search result obtained from said step of prioritizing.

In at least some embodiments of the invention, the following components are provided:

(Component A) a data repository for storing, for each user of a plurality of users, a corresponding profile having data indicative of an interest by the user in the contents of various network sites;

wherein for a first of the users, the corresponding profile (P) includes one or more of: (a) data indicative of one or more sites on a network whose content is more likely to be of interest to the first user, (b) data indicative of one or more sites on the network whose content is less likely to be of interest to the first user, and (c) data indicative of one or more other users of the plurality of users;

(Component B) a search engine for receiving a search query from the first user, and determining a plurality of search results; and (Component C) a prioritizer for receiving the search results, and determining a priority of at least one search result (SR) of the search results using data of one or more of (a) through (c) in the profile P, wherein the priority is indicative of a likely interest by the first user in the search result SR;

wherein the search result SR is presented to the first user in a position dependent upon a priority of the search result SR obtained from the prioritizer.

In another embodiment, a storage medium for storing instructions executable by a computational device is provided. When the computational device performs the instructions, a method including at least the following steps is performed:

receiving one or more network communications including one or more of: (a) data indicative of one or more sites on a network whose content is more likely to be of interest to a first user, (b) data indicative of one or more sites on the network whose content is less likely to be of interest to the first user, (c) data indicative of at least one network, the data indicative of the at least one network site obtained from one or more other users;

obtaining a search query from the first user;

determining at least a first and a second search result for responding to the search query;

prioritizing at least the first search result according to a comparison between: (1) data for the first search result, and (2) the stored one or more of: (a) through (c); and providing the user with at least a portion of the search results, wherein the first search result is presented to the first user in a position that is determined using a priority of the first search result obtained from said step of prioritizing.

Other features and benefits of the present invention will be evident from the accompanying drawings and the description hereinbelow.

BRIEF DESCRIPTION OF THE DRAWINGS

FIG. 4 shows the pseudo-code for the program "Importance_value". This program determines a user importance or interest value for a search result "RESULT" according to the (any) uploaded user visitation information as per step 228 of FIG. 2.

FIG. 5 shows the pseudo-code for the program "Similarity_importance_value". This program determines a user importance or interest value "similar_imp_val" for a search result "RESULT" according to the (any) importance values that can be derived from the search profiles of other search engine site 10 users that have been determined to be similar to the user identified by the parameter "user".

FIG. 6 shows the pseudo-code for the program "Keyword_importance_value". This program determines a user importance or interest value "keyword_imp_val" for a search result "RESULT" according to the (any) importance values that can be derived from the keywords stored in the search profile for the user identified by the parameter "user".

FIG. 7 shows the pseudo-code for the program "Prioritize_results". For each search result of one or more search results identified by the parameter "RESULTS", this program derives a user importance or interest value that is a combination of the importance values obtained from the programs of FIGS. 4-6

DETAILED DESCRIPTION

Figure 1:
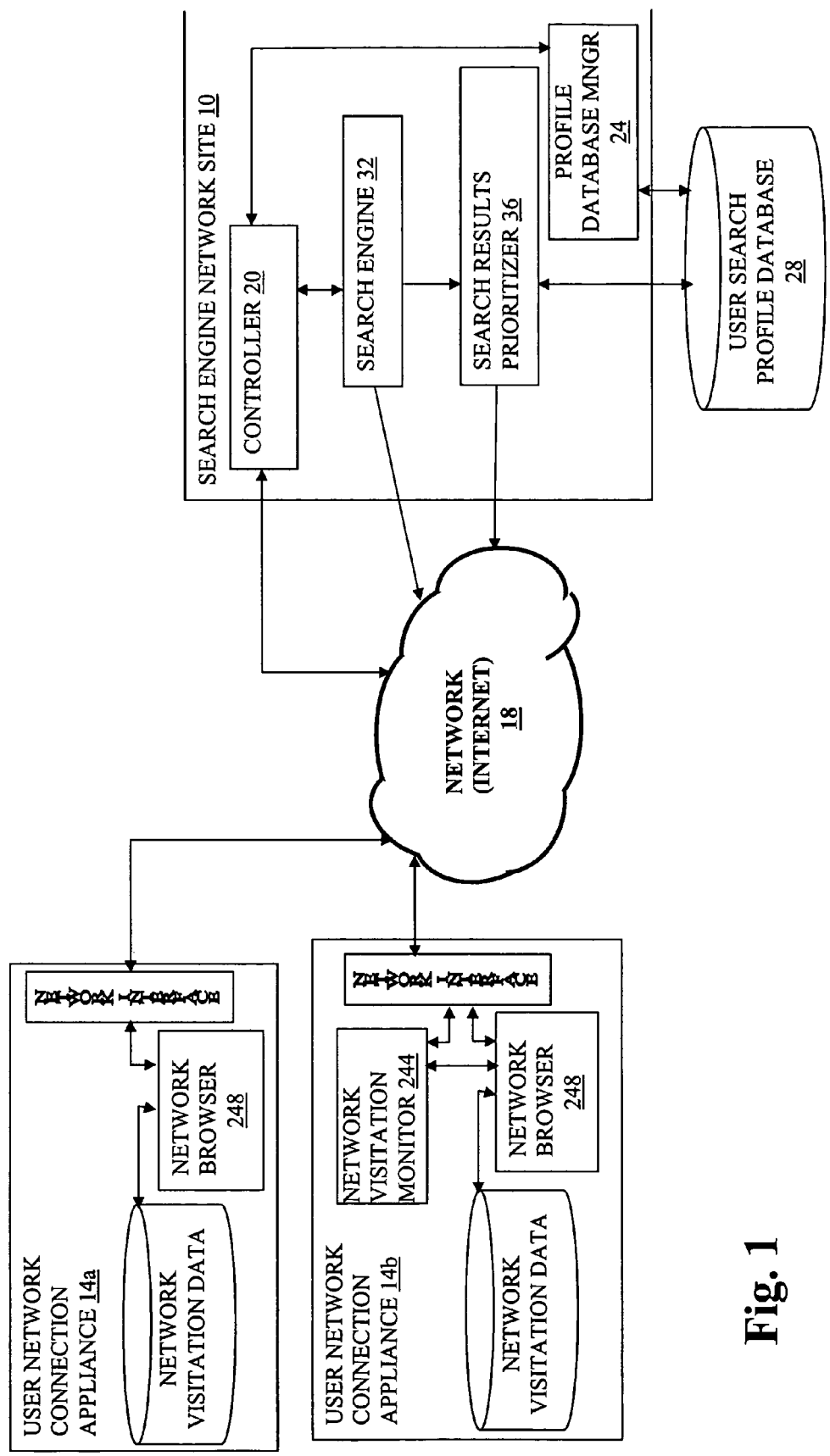
FIG. 1 is a block diagram showing the components of the present invention in an operative network context.

FIG. 1 shows the high level components of the search engine network site 10 of the present invention together with associated components that may reside at a user network connection appliance 14 (e.g., 14a or 14b). In performing network 18 searches, in response to a search query input to the search engine site 10 by a user (via a corresponding network appliance 14), a network site controller 20 has the capability to perform at least the following tasks (depending, e.g., on the user information that may be accessed and user permissions granted):

(i) providing user data indicative of the user's past searching interests to the profile database manager 24 for storing (or updating) such user data in the user search profile database 28, (ii) activating the search engine 32 for obtaining search results, and (iii) if the user has provided the user data indicative of the user's past searching interests for storing in the user search profile database 28, then such user data may be used by the search results prioritizer 36 to prioritize and/or filter search results obtained by the search engine 32 so that the prioritized search results are customized to better meet the user's needs. In particular, such prioritizing of search results may reorder the search results so that the results more consistent with the user's interests, and/or more consistent with the interests of "similar" users are presented to the user first.

Figure 2:
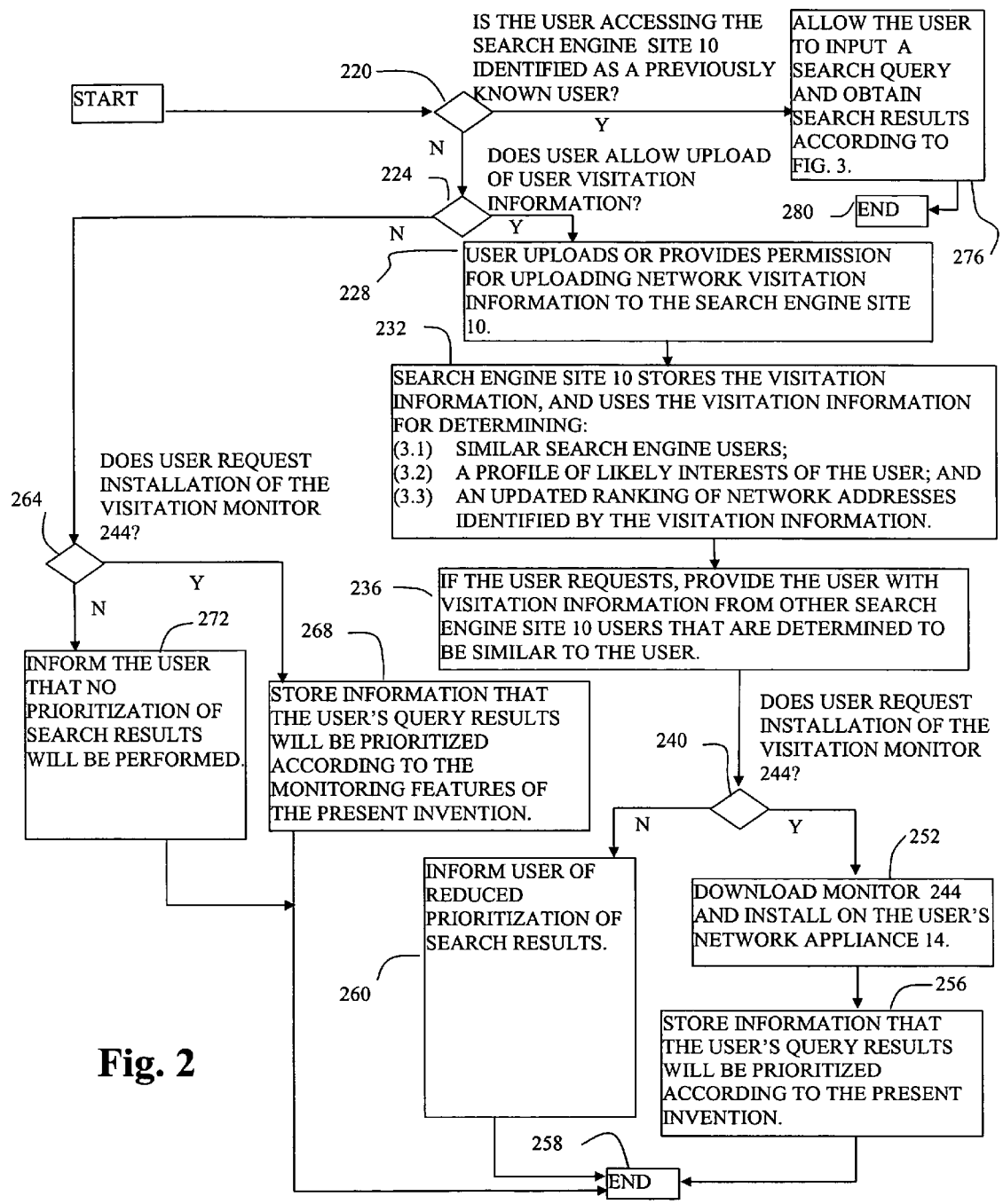
FIG. 2 is a flowchart of the high-level steps performed by the search engine network site 10 of the present invention when accessed by a user via a user network connection appliance 14 and the network 18.

FIG. 2 shows a flowchart showing how a user may request use of the search engine site 10 of the present invention. Assuming a user accesses the search engine network site 10, via a corresponding network connection appliance 14a and the communications network 18 (e.g., the Internet), a determination is made by the controller 20 as to whether the user is already known to the search engine site (step 220). For example, a login or another user identification technique (such as an Internet cookie) may be used to identify the user for determining if the user has previously visited the search engine site 10. If the user is not known to the search engine site 10, then commencing with step 224, the search engine site provides the user with the option of providing personal information that can assist the search engine site in providing customized search results to the user, wherein such search results are ordered, filtered and/or ranked according to a user searching profile maintained by the search engine site. In particular, the search engine site 10 may request an upload the user's network "visitation information" (which herein refers to any information which may be predictive of the user's searching interests and/or the user's searching disinterests). Such visitation information may include network site/address identifications, such as provided in the user's bookmarks, and/or cookies resident at the user's network connection appliance 14, as well as user indications of which network sites are of most interest to the user and/or of the least interest to the user. For example, the user may be presented with explanatory information informing the user that the more information the search engine site 10 collects about the user's searching interests, the better the search engine site may be able to prioritize search results provided by the search engine site (wherein the term "prioritize" when referring to search results denotes one or more of ordering, filtering, prioritizing and/or ranking of the search results). Thus, the user may be given various options as to the amount of personal visitation information the user can provide to the search engine site 10, and with each option, an explanation of the additional benefits the search engine site 10 can provide to the user, including providing more appropriate search results to the user's search queries. In particular, the user can be given the following options:

(1.1) Provide no personal visitation information, wherein the search engine site 10 will not be able to customize any search results according to the method of the present invention; however, in at least one embodiment, the search engine site may still be able to rank such search results in a non-customized way based on other users' visitation information, e.g., those websites that appear to be most popular with other users;

(1.2) Provide visitation information indicative of past network sites visited by the user so that the search engine site 10 may be able to perform a first extent of prioritizing (i.e., prioritizing search results according to user input of past visitation information) for prioritizing search results. Note that such past visitation information may include network bookmarks (also referred as "favorites" in Microsoft's Internet Explorer), network addresses identified by cookies, and/or other network sites that the user accesses frequently. Note of particular interest are network sites that are identified by the user as particularly useful, or that can be presumed to be particularly useful to the user. Moreover, in at least some invention embodiments, it is presumed that network bookmarks are generally expected to identify network sites that are more useful than, e.g., sites identified by cookies whenever such bookmarks have: (a) creation dates at least six months earlier than a most recently accessed date, and (b) the most recent accessed date is within the previous three months;

(1.3) Provide consent to allow the search engine site 10 to obtain future visitation information, e.g., obtained from monitoring the user's responses to future search results, and/or periodically uploading a collection of the user's bookmarks and/or cookies. In particular, by obtaining repeated updates on the user's visitation information, the search engine site 10 can perform a likely more accurate second extent of prioritizing of search results (e.g., websites, web pages, etc.) in response to search queries provided even further in the future. In particular, the search engine site 10 may monitor the user's responses to search results for determining the network sites (and/or the contents thereof) that appear to be of more interest (and/or of less interest) to the user depending on how the user responds to such search results; and/or (1.4) Identify on a query-by-query basis which of the above searching prioritizing options is desired (e.g., no prioritizing, first extent prioritizing, second extent prioritizing, or both first and second extent prioritizing).

Thus, in step 224, if the user allows the uploading of the user's past network visitation information (or some portion thereof), then (in step 228) such visitation information is uploaded to the search engine site 10. Note that in one embodiment, the user may be presented with a display showing his/her network bookmarks and/or cookies so that the user can perform one or more of the following:

(2.1) Remove one or more network site designations from the collection to be uploaded to the search engine site 10;

(2.2) Mark one or more network site designation as private such that, e.g., at no future time will the present invention request, or monitor network visitation information related to particular bookmarks, or folders/cabinets of bookmarks; and/or (2.3) Rank or order one or more network site/address designations in the collection to be uploaded to the search engine site 10, wherein the ranking or ordering is indicative of the user's perception of the relative importance of each such ranked site. Note that in one embodiment, the user may provide a quality or importance rating for one or more network sites on a scale, for example, from zero to five, wherein five is the highest rating (indicative of high user importance/interest), and zero is the lowest rating (indicative of strong user dislike/disinterest). Note that such a user rating may be subsequently scaled to the range $[-1, +1]$ for use by the search engine site 10 (such scaled values denoted herein as "user importance values", and in FIG. 4 described hereinbelow), wherein a value of $-1$ indicates a pronounced or confirmed disinterest/dislike of the content of the network site, a value of 0 indicates substantially no user positive or negative preference, a value of $+1$ indicates a highest user importance/interest in the network site, and the greater the importance value, the more important/interest the network site (or content thereof) is perceived by the user. Of course, the user may not rank or order one or more of such network site designations. In such a case, the present invention may provide a default importance value to such a user non-ranked network site designation, wherein the user importance value is presumed to be indicative of the value that the user places on the informational content of the network site. For example, note that for a user that has not previously provided personal network visitation information to the search engine site 10, network sites identified by bookmarks as described in (1.2)(i)(a) and (b) above may be provided with a greater default importance value than other uploaded network site references obtained from cookies or other bookmarks.

In summary, step 228 uploads to the search engine site 10 substantially only user past visitation information, and any corresponding ranking information. However, note that the user may be given the opportunity to add any additional information that could assist the search engine site 10 in prioritizing search results. For example, the user may be able to provide additional network sites that the user has found important and/or that the user wants to reduce the importance thereof.

Subsequently in step 232, the search engine site 10 stores the uploaded visitation information in the user search profile database 28, and uses this information for performing the following:

(3.1) The search engine site 10 (and more particularly, the profile database manager 24) determines a similarity between the user's uploaded visitation information and corresponding visitation information provided by other search engine site 10 users. Note that there are various techniques that may be used to determine a similarity between the user's visitation information and such information for other users. For example, the following technique may be used.

For a second search engine site user, assume a similarity value (SV) with the user is initially zero, and then perform the following steps:

(3.2.1) Increase the similarity value SV for the user whenever a comparison determines that there is a reference (e.g., Internet address) to exactly the same network site, N, that has been accessed by both users in the past, e.g., six months. For example, SV may be incremented by SVInc=[the user's importance value for N]*[the second user's importance value for N];

(3.2.2) For each network site N, where N provides access to a plurality of network content pages, if a comparison of the visitation information for each of the user and the second user determines that there is a recently (e.g., within the past 6 months) accessed page, different from the other user, for the site N, then SV may be increased by, e.g., the increment SVInc=½*[the user's importance value for N]*[the second user's importance value for N];

(3.2.3) For a predetermined categorization of network sites according to information content, if a comparison of the visitation information for both the user and the second user determines that there is a recently (e.g., within the past 6 months) network site in the in a same category, then SV may be increased by, e.g., the increment SVInc=⅛*[the user's importance value for N]*[the second user's importance value for N];

(3.2.4) Additionally, for each similarity value increase (SVInc) above, add another ½*SVInc whenever a comparison of the visitation information for the user and the second user determines that both have accessed the corresponding network site within, e.g., the last three months.

Subsequently, the profile database manager 24 stores information identifying each of the other search engine site 10 users that are "similar" to the user together with a corresponding normalized similarity value (NSV) (e.g., NSV=SV/[max SV over all second users]).

Note that the user and another user may be considered similar whenever one or more (preferably all) of the following hold:

(3.2.5) The normalized similarity value NSV is greater than or equal to a predetermined number (e.g., at least greater than 0.75);

(3.2.6) SV is one of, e.g., the 100 largest similarity values among all search engine site 10 users different from the user; and/or (3.2.7) SV is within the, e.g., the highest 2% of the similarity values indicating a similarity with the user.

Note that the collection of similar users may be used for:
(i) providing the current user with the identities of additional network sites (e.g., bookmarks) from the uploaded visitation information of similar search engine site 10 users, and/or (ii) prioritizing the user's search results that are identified in (or related to) the uploaded visitation information of similar users, e.g., by moving results of interest to such similar users nearer to the beginning of the search result list returned to the user.

(3.2) The search engine site 10 (and more particularly, the profile database manager 24) determines a search profile for the user, wherein the profile includes the user's likely interests as derived from the uploaded visitation information. For example, a list of keywords may be obtained from the content at each network site/address identified by the user's visitation information, wherein the content has been accessed by the user in the past six months (e.g., such keywords may be obtained from the metatags HTML portion of the information at such a network site/address). Subsequently, all such keywords having a frequency of occurrence (in the user's uploaded network references of the visitation information) of at least one standard deviation above the mean number of such frequencies of occurrences are presumed to be indicative of the user having an interest in topics having such keywords, and accordingly these keywords are added to the user's search interest profile so that such keywords (and/or synonyms thereof) may be used to compare with the contents of subsequent search results, and thus, to prioritize the search results (e.g., network sites) according to the interests of the user. Note that in FIG. 6 described hereinbelow, the collection of keywords described here is denoted "Pos_keywords".

(3.3) The search engine site 10 (and more particularly, the profile database manager 24) ranks network sites (e.g., websites and/or individual pages), wherein such a ranking is used for identifying network sites that search engine site 10 users have found important or useful (and/or unimportant or not useful). In one embodiment, such a ranking for a network site may be substantially a corresponding importance value (as described hereinabove) for the network site.

Following step 232, in step 236, the user may request and receive identifications of network sites/addresses that have been determined to be of interest or important to search engine site 10 users similar to the user. Subsequently, in step 240, a determination is made as to whether the user will install network site visitation monitor 244 (FIG. 1) that can be downloaded to his/her network connection appliance 14*a*, wherein such a monitor is able to at least monitor the user's response(s) (or lack thereof) to search results received from the search engine site 10, and to provide user search response information to the search engine site 10. In particular, such a monitor 244 may be able to:

(4.1) Record the number and/or frequency of accesses to various network sites/addresses so that such information can be periodically uploaded to the search engine site 10 and used to update the information determined in (3.1) through (3.3) hereinabove;

(4.2) Identify and record search result network sites/addresses that appear to be of interest to the user in that, e.g., the user visits one of these network sites, and then does not return to the list of search results provided by the search engine site 10, or returns to the list of search results only after an extended length of time at the network site (e.g., 10 minutes). Moreover, the monitor 244 or the search engine site 10 may determine an importance value (or an importance value increment) indicative of the user's apparent interest in each such network site, wherein the importance value (or increment therefor) may be used in determining an aggregate importance value for the network site as described in (4.4) below;

(4.3) Identify and record search result network sites/addresses that are not of interest to the user in that, e.g., the user ignores such search results (i.e., the user does not visit such sites), and/or visits such network sites/addresses less than a very short time (e.g., less than 30 seconds). Moreover, the monitor 244 or the search engine site 10 may determine an importance value (or an importance value increment) indicative of the user's apparent disinterest in each such network site; and (4.4) Determine, for each search result network site/address that has one or more importance values as per (4.2) and/or (4.3), a corresponding aggregate importance value indicative of all importance values previously determined for the network site. For example, such an aggregate importance value may be the average of the individual importance values for the network site. Note that the determination of such aggregate importance values may also be performed at the search engine site 10.

Thus, when such search response information is transmitted to the search engine site 10, the information can be used to prioritize subsequent search results. In particular, such search response information may be used to: (a) identify network sites that have been determined to be of interest to the user, (b) identify network sites that have been determined to be of unlikely interest to the user, (c) identify keywords corresponding with network sites that have been determined to be of interest to the user, and (d) identify keywords corresponding with network sites that have been determined to be of unlikely interest to the user (note this last collection of keywords is denoted "Neg_keywords" in FIG. 6 described hereinbelow).

Moreover, note that in one embodiment, such a monitor 244 may be provided as part of the functionality of a network browser toolbar (not shown) that can be incorporated into a network browser 248 (FIG. 1) residing at the user's network connection appliance 14, wherein the tool bar may provide the following additional functionality:

(5.1) The tool bar may provide the user with the capability to upload to the search engine site 10 particular network site identifications that the user has found of particular importance for use in updating the information determined in (3.1) through (3.3) hereinabove;

(5.2) The tool bar may provide the user with the capability to specify on a query-by-query basis which of the above searching prioritizing options is desired (e.g., no prioritizing, first extent prioritizing, or both first and second extent prioritizing) as mentioned in (1.4) hereinabove.

If step 252 is next performed, wherein the user downloads and installs the network visitation monitor 244 on his/her network connection appliance 14 (thereby providing the configuration shown for network connection appliance 14*b*), then upon confirmation of installation, the search engine site 10 (and more particularly, the profile database manager 24) may store information in the user's search profile indicating that the user's subsequent search results are to be prioritized (step 256). Subsequently, the collection of initial user information terminates (step 258), and the controller 20 ceases communication with the user unless the user requests further services such as requesting search results.

Alternatively, if (in step 240) the user does not download and install the monitor 244, then (in step 260) the user may be informed that the subsequent searches will be not be as fully prioritized as could otherwise be. Subsequently, step 258 is performed.

Returning now step 224, if the user does not allow the upload of his/her user visitation information, then step 264 is performed where a determination is made as to whether the user requests installation of the visitation monitor 244. If the user installs the visitation monitor 244, then upon installation the monitor alerts the search engine site 10 of its installation so that search engine site can store information in the user's search profile indicating that the user's subsequent search results are to be prioritized (step 268). Subsequently, step 258 is again performed. If, however, the user does not install the visitation monitor 244, then step 272 is performed alerting the user to the fact that the search engine site 10 will not prioritize search results according to the present invention. Subsequently, step 258 is again performed.

Figure 3:
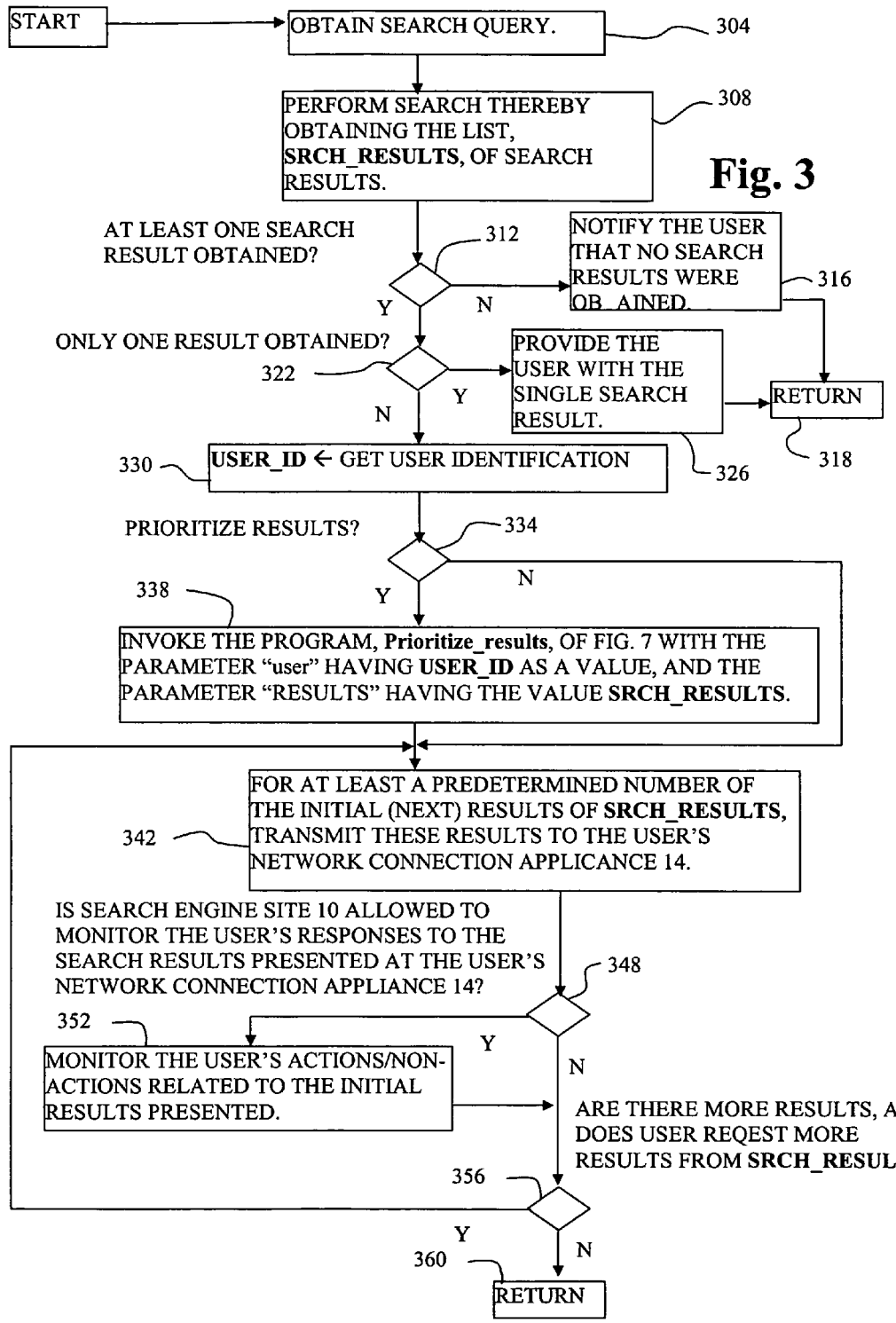
FIG. 3 is a flowchart of the high-level steps performed by the search engine network site 10 when a user inputs a search query to the search engine site.

Returning now to step 220, if the user is known to the search engine site 10, then when the user inputs a search query to the search engine site, step 276 is performed wherein a search is performed via the flowchart of FIG. 3. Thus, as described further hereinbelow, FIG. 3 obtains the (any) search results, and provides such results to the user, wherein the results are prioritized according to the present invention when there is appropriate information stored in the user search profile database 28. Subsequently in step 280, the controller 20 terminates processing related to the user's search query.

In order to describe the processing performed in FIG. 3, it is worthwhile to describe various programmatic elements that are activated, via FIG. 3, for determining the importance values for search results, and for using such importance values for prioritizing these search results. In particular, the programs shown in FIGS. 4 through 7 are first described.

In FIG. 4, the pseudo-code is shown for deriving the importance value for a search result according to the (any) uploaded user visitation information as described in step 228 of FIG. 2. That is, for the parameter "user" identifying the user for which a search result has been obtained, and for the parameter "RESULT" identifying one of the one or more items from the search result, the program "Importance_value" returns a numerical value "user_imp_val" (line 408) indicative of the estimated importance of "RESULT" to the user. In particular, if a comparison of "RESULT" and a network site for which a user importance value has been associated yields an exact match, then "user_imp_val" is assigned this value (lines 401 and 402). Alternatively, if there are a plurality of differently addressed network pages (or presentations) having similar content and provided by the same network site (or, e.g., provided by the corporation), then it is typical that the initial portion of the network addresses for all such content pages are identical and identify only this plurality of pages. For example, Internet pages having an initial portion of their URL (uniform resource locator) as "www.avaya." are provided by Avaya Inc., and such Internet pages are generally directed to matters concerned with Avaya, such as Avaya products and services. Thus, if a user importance value has been determined for a particular page (P) of a plurality of content similar pages with the same initial portion of their network addresses, and "RESULT" is determined (by comparing network addresses) to be a different one of these pages, then "user_imp_val" is assigned half the importance value of P (lines 403 to 406). However, if "RESULT" does not satisfy either of the conditions of line 401 or line 403, then it is assumed that no importance value can be derived from the current visitation information supplied by the user, and accordingly "user_imp_val" is set to zero.

In FIG. 5, the pseudo-code for the program "Similarity_importance_value" is shown. This program derives an importance value "similar_imp_val" for a search result "RESULT" according to the (any) importance values that can be derived from the search profiles of other search engine site 10 users that have been determined to be similar to the present user. That is, the parameter "RESULT" identifies a network addressable page (or presentation) obtained from a search query provided by the present user, the parameter "similar_users" identifies the zero or more users that have been determined to be similar to the present user (e.g., step 232 (3.1)), and a numerical value for "similar_imp_val" is determined (lines 505 and 506, or, line 507) that is indicative of an estimated aggregate importance of "RESULT" for the users that are similar to the present user. Accordingly, assuming that there is at least one similar user (line 501), in lines 502 and 503, the program of FIG. 4 is iteratively invoked for each similar user "similar_users[i]", wherein an importance value of "RESULT" for the similar user identified by "similar_users [i]" is determined. Subsequently, in lines 505 and 506, an average importance value is determined and assigned to "similar_imp_val". Either this average importance value or zero is then returned as the value for "Similarity_importance_value".

In FIG. 6, the pseudo-code for the program "Keyword_importance_value" is shown. This program derives an importance value "keyword_imp_val" for a search result "RESULT" according to the (any) importance values that can be derived from the keywords stored in the search profile for the present user. That is, the parameter "user" identifies the user's data in the user search profile database 28, the parameter "RESULT" identifies a network addressable page (or presentation) obtained from a search query provided by the present user, the parameter "Pos_keywords" identifies the one or more keywords have been obtained from network pages (or presentations) that the present user is presumed to have previously had an interest in the content thereof, the parameter "Neg_keywords" identifies the one or more keywords have been obtained from network pages (or presentations) that the present user is presumed to have previously been disinterested in the content thereof. Accordingly, in lines 601 and 602, the total number of keywords in "Pos_keywords" and the total number of keywords in "Neg_keywords" are obtained, respectively, in "Total_pos" and "Total_neg". In line 603, the number of keywords for the network page (or presentation) identified by "RESULT" is obtained (e.g., from a meta-tag descriptor, as one skilled in the art will understand), and assigned to "site_keywords". Subsequently, in lines 604 and 605, by comparing keywords in "site_keywords" with keywords in "Pos_keywords", the number of keywords in "site_keywords" that are also in "Pos_keywords" is assigned to "Nbr_site_positive_keywords". Similarly, in lines 606 and 607, by comparing keywords in "site_keywords" with keywords in "Neg_keywords", the number of keywords in "site_keywords" that are also in "Neg_keywords" is assigned to "Nbr_site_negative_keywords". Then in lines 608 through 614, a keyword importance value is determined and assigned to "keyword_imp_val". Note that "keyword_imp_val" will be a value in the range [−1, +1], wherein a −1 value indicates that "RESULT" has all the negative keywords and none of the positive keywords (computed in line 610), and, a +1 value indicates that "RESULT" has all the positive keywords and none of the negative keywords (computed in line 613). Of course, if the keywords for "RESULT" do not match the keywords in "Pos_keywords", and also do not match the keywords on "Neg_keywords", then "keyword_imp_val" is assigned zero in line 609. In line 616, the value of "keyword_imp_val" is returned to a calling program.

In FIG. 7, the pseudo-code for the program "Prioritize_results" is shown. For each search result of one or more search results identified by the parameter "RESULTS", this program derives an importance value that is a combination of the importance values obtained from programs of FIGS. 4-6, and then re-orders the search results of "RESULTS" (lines 711 through 713) so that individual search results "RESULTS[j]" having a higher combined importance value "RESULT[j] .importance" are moved toward the front of "RESULTS", and the search results "RESULTS[j]" having a lower combined importance value for "RESULT[j].importance" are moved toward the end of "RESULTS". Note that the parameters "wt1", "wt2", and "wt3" are predetermined weights that can be used to vary the importance of the individual importance values obtained from the programs of FIGS. 4-6. Also note that the computation of "RESULT[i].importance" is always defined.

FIG. 3 will now be described. In step 304, the user's search query is obtained by the controller 20. In step 308, the controller 20 provides the search engine 32 with the search query for activating the search engine and obtaining the corresponding search results in "SRCH_RESULTS". Subsequently, in step 312, the search engine 32 determines whether at least one search result was obtained. If not, then in step 316 the search engine 32 notifies the controller 20 that no results were obtained and terminates its activation. The controller 20 subsequently notifies the user that no search results were obtained. Subsequently, the controller 20 ceases communication with the user (step 318) unless the user requests further services such as requesting additional search results. Alternatively, if step 312 determines that at least one search result was obtained, then step 322 is performed wherein a further determination is made as to whether only a single result was obtained. If so, then in step 326 the single result is returned to the user, and step 318 is again performed. Alternatively, if step 322 determines that the search engine 32 has obtained more than one search result, then in step 330 the controller 20 obtains the user's identification (if not obtained previously) from the profile search database 24, and in step 334 determines whether the search results should be prioritized. If the search results are to be prioritized, then step 338 is performed by the search results prioritizer 36, wherein the program of FIG. 7 is activated with "user" having the user's identification, and "RESULTS" having the search results to be reordered. Subsequently, regardless of whether the search results are prioritized or not, in step 342, at least a predetermined number of items from the search results are transmitted to the user's network connection appliance 14 for presentation thereon. Subsequently, in step 348 a determination is made by the controller 20 as to whether the search engine site 10 is allowed to monitor the user's responses to the search results (e.g., via a network visitation monitor 244) for obtaining additional user related information that can be used to better prioritize subsequent search results. Accordingly, if monitoring can be performed, then in step 352, data indicative of the user's response (and/or non-response) to each search result (R) presented to him/her is transmitted to the search engine site 10. Accordingly, when data is received indicative of the user's response to a result R (e.g., such data including (4.2) above), the controller 20 in combination with the profile database manager 24 performs the following: (a) depending on the interest the user shows in the informational content of the network site corresponding to the result R, the network site may be put on either of a list of sites of interest to the user, or on a list of sites of disinterest to the user; and/or (b) the keywords for the network site corresponding to the result R may be used to enhance the list of keywords indicative network site content that is of interest or of disinterest to the user. Subsequently, in step 356, a determination is made as to whether any additional portion of the search results is to be transmitted to the user's network connection appliance 14. If so, then step 342 is again performed. If not, then the flow of control is transferred (via step 360) to step 280 of FIG. 2.

Although various components of the present invention have been described in terms of communications on an IP network such the Internet, it is within the scope of the present invention to encompass other types of networks, for example, Novell or AppleTalk networks. Additionally, the components described hereinabove of the search engine site 10 may be distributed on one or more networks, as one skilled in the art will understand.

Those skilled in the art will also understand that networked computational components in accordance with the above invention disclosure and using known programming languages provides suitable means for realizing the various functions, methods, and processes as described and claimed herein and as illustrated in the accompanying figures attached hereto.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method comprising:
   (a) receiving, by a search engine site, a network search query from a first user;
   (b) determining, by the search engine site, at least first and second search results for responding to the search query;
   (c) thereafter prioritizing, by the search engine site, at least the first and second search results based on first visitation information related to at least one first network site visited previously by the first user and second visitation information related to at least one second network site visited previously by at least one other second user; and
   (d) providing, by the search engine site, the user with at least a portion of the prioritized first and second search results;

wherein step (b) comprises the substeps:
   (B1) displaying, by the network appliance, first visitation information to the first user prior to the first visitation information being provided to the search engine site;
   (B2) receiving, by the network appliance, from the first user at least one of the following:
      (i) a selection of one or more network site designations to be removed from the displayed first visitation information;
      (ii) a designation of one or more network site designations in the displayed first visitation information as being private; and
      (iii) a rank and/or order of one or more network site designations in the displayed first visitation information, wherein the rank and/or order is indicative of the first user's perception of a relative importance of each such ranked and/or ordered site.

2. The method of claim 1, wherein step (b) comprises:
   (B1) determining, by the search engine site, whether the first user is known;
   (B2) when the first user is not known, providing, by the search engine site, the first user with an option to provide personal information to assist the search engine in providing customized search results to the first user, the personal information being predictive of the first user's searching interests and/or disinterests and comprising at least one of the first user's bookmarks and cookies resident on the network appliance.

3. The method of claim 2, wherein, in substep (B2), the search engine provides the first user with a plurality of the following options:
   (i) provide to the search engine site no personal information;
   (ii) provide to the search engine site historic personal information indicative of past network sites visited by the first user; and
   (iii) provide to the search engine site consent to allow the search engine to monitor the first user's responses to future personal information indicative of future network sites to be visited by the first user.

4. The method of claim 3, wherein each of the options (i)-(iii) is presented to the first user.

5. The method of claim 1, wherein (i) is received from the first user and wherein the selected one or more network site designations are removed from the first visitation information prior to the first visitation information being uploaded to the search engine site.

6. The method of claim 1, wherein (ii) is received from the first user and wherein the private one or more network site designations are removed from the first visitation information prior to the first visitation information being uploaded to the search engine site.

7. The method of claim 1, wherein (iii) is received from the first user and wherein the rank and/or order of the one or more network site designations are uploaded to the search engine site.

8. The method of claim 1, wherein step (b) comprises the substeps of:
   (B1) uploading, from the network appliance to the search engine site the first visitation information;
   (B2) determining, by the search engine site, a similarity between the first visitation information and second visitation information and applying the following rules:
      (B2i) when the first and second visitation information are similar to one another, the first and second users are determined to be similar to one another; and (B2ii) when the first and second visitation information are dissimilar to one another, the first and second users are determined to be dissimilar to one another;

(B3) when the first and second users are determined to be similar to one another, storing information identifying the second user as being similar to the first user together with a similarity value relative to the first user; and (B4) determining a search profile for the first user, wherein the profile includes the first user's likely interests as derived from the first visitation information, wherein in step (c) the search engine site ranks network sites, the ranking identifying network sites that other users have found desirable or undesirable.

9. The method of claim 8, wherein, in substep (B2), a plurality of the following rules are applied:
   (i) for a selected search engine site user other than the first user, increase the respective similarity value when a comparison of the first and second visitation information identifies a reference to a same network site that was accessed previously by the first user;
   (ii) for a selected search engine site visited by the first user and the selected search engine site user, increase the respective similarity value when a comparison of the first and second visitation information identifies a reference to web page from the selected search engine site; and
   (iii) for a predetermined categorization of network sites according to information content, increase the respective similarity value when a comparison of the first and second visitation information identifies a reference to network sites in a common category.

10. The method of claim 1, further comprising:
    (d) with the consent of the first user, monitoring, by a network site visitation monitor, the first user's future response to search results subsequently provided to the first user by the search engine site and forwarding the collected information to the search engine site for use as second visitation information.

11. The method of claim 1, wherein the network communication is via the Internet, wherein said first visitation information includes data indicative of a bookmark stored at a network connection appliance by which said first visitation information is transmitted, wherein said first visitation information includes data indicative of a cookie stored at a network connection appliance by which said first visitation information is transmitted, wherein said first visitation information includes a rating by the first user of the network site previously visited, and further including steps of providing the first user with the search results in an order corresponding to the prioritized search results from said step of prioritizing and second receiving data related to one or more user responses to the search results.

12. The method of claim 11, wherein said second receiving step includes at least one of the following:
    receiving an indication that at least one of the search results is of interest to the first user; and
    receiving an indication that at least one of the search results is not of interest to the first user and wherein said prioritizing step includes at least one of:
       determining a similarity between: (i) one or more keywords for a network site of the search results, and (ii) one or more keywords obtained for at least one network site previously visited by the first user; and
       determining an indication of a dissimilarity between: (i) one or more keywords for a network site of the search results, and (ii) one or more keywords obtained for at least one network site determined to be of reduced interest to the first user.

13. A computer readable medium having stored thereon processor executable instructions to perform the steps of claim 1.

14. The method of claim 1, wherein the first visitation information is associated with an identifier of the first user and does not include a network site visited by the second user and wherein the second visitation information is associated with an identifier of the second user and does not include a network site visited by the first user and wherein the first and second users use differing network connection appliances.

15. The method of claim 1, wherein step (b) includes the sub-steps:
    (A1) determining that a first subset of second visitation information is similar to the first visitation information;
    (A2) determining an aggregate importance value for a first subset of first visitation information, the aggregate importance value being a function of an importance value associated with the first user, a similarity importance value associated with a selected subset of second visitation information, a keyword importance value associated with a keyword importance value of a keyword referenced in the first visitation information, the keyword being indicated as being of interest or disinterest to the first user, and a respective weighting value assigned to each of the first user importance value, similarity importance value, and keyword importance value; and
    (A3) repeating substeps (A1) and (A2) with a plurality of other subsets of first visitation information; and
    (A4) organizing the subsets of first visitation information based on the relative aggregate importance value of each subset of first visitation information.

16. An apparatus for providing search results in response to a search query provided by a user, comprising:
    a data repository for storing, for each user of a plurality of users, a corresponding profile having data indicative of an interest by the respective user in a content of various network sites;
    wherein, for a first of the users, the corresponding profile (P) includes one or more of:
       (a) data indicative of one or more sites on a network whose content is more likely to be of interest to the first user, and
       (b) data indicative of one or more sites on the network whose content is less likely to be of interest to the first user, and further including:
       (c) data indicative of one or more other users of the plurality of users, the first user and one or more other users using differing network connection appliances;
    a search engine for receiving a search query from the first user and determining a plurality of search results; and
    a prioritizer for receiving the plurality of search results, and determining relative priorities of the plurality of search results based on one or more of (a) and (b) and on (c) in the profile P, wherein the priority of each search result SRi in the plurality of search results is indicative of a likely interest by the first user in the search result SRi;
    wherein a listing comprising each SRi is presented by a network appliance to the first user in a position in the listing dependent upon the priority of each SRi;
    wherein the network appliance:
    displays first visitation information to the first user prior to the first visitation information being provided to the search engine; and receives from the first user at least one of the following:
- (i) a selection of one or more network site designations to be removed from the displayed first visitation information;
- (ii) a designation of one or more network site designations in the displayed first visitation information as being private; and
- (iii) a rank and/or order of one or more network site designations in the displayed first visitation information, wherein the rank and/or order is indicative of the first user's perception of a relative importance of each such ranked and/or ordered site.

17. The apparatus of claim 16, wherein the search engine provides the first user with a plurality of the following options:
- (i) provide to the search engine no personal information;
- (ii) provide to the search engine historic personal information indicative of past network sites visited by the first user; and
- (iii) provide to the search engine consent to allow the search engine to monitor the first user's responses to future personal information indicative of future network sites to be visited by the first user.

18. The apparatus of claim 16, wherein (i) or (ii) is received from the first user and wherein the selected one or more network site designations are removed from the first visitation information prior to the first visitation information being uploaded to the search engine site.

19. The apparatus of claim 16, wherein (iii) is received from the first user and wherein the rank and/or order of the one or more network site designations are uploaded to the search engine site.

20. The apparatus of claim 16, wherein said profile P includes each of (a) through (c), and said prioritizer includes a component for combining: (1) a first result indicative of the first user's likely interest in the search result SR, wherein the first result is dependent upon the data of a first of the at least two of (a) through (c), and (2) a second result indicative of the first user's likely interest in the in the search result SR, wherein the second result is dependent upon the data of a second of the at least two of (a) through (c) and wherein said prioritizer includes a component for prioritizing the search result SR by comparing data indicative of SR with data of at least one of (a) and (b).

21. The apparatus of claim 16, wherein a first profile of the first user corresponds only to the first user and not to a second user and a second profile of the second user corresponds only to the second user and not to the first user, wherein first visitation information relating to a network site visited by the first user is contained in the first profile and second visitation information related to a network site visited by the second user is contained in the second profile, wherein the prioritizer determines, based on the first and second visitation information, whether the first and second users are similar to one another, and, when the first and second users are determined to be similar, uses the first and second visitation information to prioritize SR, wherein the data indicative of SR includes words representative of a content of SR and wherein data, D, for at least one of (a) and (b) is received from an executable program resident on a network connection appliance, wherein said executable program monitors the first user's responses to the search results, and transmits the data D to a network site for storing the data in said data repository.

\* \* \* \* \*

UNITED STATES PATENT AND TRADEMARK OFFICE
CERTIFICATE OF CORRECTION

| | | |
|---|---|---|
| PATENT NO. | : 8,635,216 B1 | Page 1 of 1 |
| APPLICATION NO. | : 10/956958 | |
| DATED | : January 21, 2014 | |
| INVENTOR(S) | : Neil Hepworth and Paul Roller Michaelis | |

It is certified that error appears in the above-identified patent and that said Letters Patent is hereby corrected as shown below:

In the Claims:

At Column 14, line 61, after "engine site" please add --,-- therein.

Signed and Sealed this
Third Day of June, 2014

Michelle K. Lee
*Deputy Director of the United States Patent and Trademark Office*